(12) United States Patent
Kasashima

(10) Patent No.: US 7,753,027 B2
(45) Date of Patent: Jul. 13, 2010

(54) APPARATUS AND METHOD FOR CONTROLLING KNOCK IN AN INTERNAL COMBUSTION ENGINE

(75) Inventor: Kenji Kasashima, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 227 days.

(21) Appl. No.: 12/065,641

(22) PCT Filed: Jun. 19, 2007

(86) PCT No.: PCT/IB2007/001639

§ 371 (c)(1),
(2), (4) Date: Mar. 4, 2008

(87) PCT Pub. No.: WO2007/148200

PCT Pub. Date: Dec. 27, 2007

(65) Prior Publication Data

US 2008/0228381 A1 Sep. 18, 2008

(30) Foreign Application Priority Data

Jun. 21, 2006 (JP) .............................. 2006-171411

(51) Int. Cl.
*F02P 5/00* (2006.01)
*F02P 5/04* (2006.01)

(52) U.S. Cl. ............................. 123/406.21; 123/406.29

(58) Field of Classification Search ............ 123/406.21, 123/406.23, 406.24, 406.29; 701/111; 73/35.01, 73/35.03, 35.06
See application file for complete search history.

(56) References Cited

U.S. PATENT DOCUMENTS

| 4,895,121 A | * | 1/1990 | McCoy et al. .......... 123/406.13 |
| 4,993,387 A | * | 2/1991 | Sakakibara et al. .... 123/406.33 |
| 5,269,178 A | | 12/1993 | Vigmostad et al. |
| 6,446,601 B1 | | 9/2002 | Franke et al. |
| 6,863,052 B2 | * | 3/2005 | Takahashi et al. ...... 123/406.13 |

FOREIGN PATENT DOCUMENTS

| JP | 6-101556 A | 4/1994 |
| JP | 7-247947 A | 9/1995 |
| JP | 2002-364446 A | 12/2002 |
| JP | 2003-278592 A | 10/2003 |
| JP | 2005-248804 A | 9/2005 |
| WO | WO 2007/062470 A1 | 6/2007 |

* cited by examiner

*Primary Examiner*—Mahmoud Gimie
(74) *Attorney, Agent, or Firm*—Sughrue Mion, PLLC

(57) ABSTRACT

A knock control apparatus for an engine includes: a first determination device that determines whether the engine is knocking based on an output signal of a knocking detector provided in the engine; a controller that retards an ignition timing of the engine when the first determination device determines that the engine is knocking; and a second determination device that confirms whether the engine is knocking based on an output torque of the engine that is obtained when the controller retards the ignition timing.

18 Claims, 3 Drawing Sheets

APPARATUS AND METHOD FOR CONTROLLING KNOCK IN AN INTERNAL COMBUSTION ENGINE

BACKGROUND OF THE INVENTION

1. Field of the Invention

The present invention relates to an apparatus and method for controlling knock in an internal combustion engine.

2. Description of the Related Art

When the ignition timing of the internal combustion engine is too advanced, knocking occurs due to abnormal combustion, which can damage the cylinders and the pistons. Some internal combustion engines are thus provided with a knock control apparatus to prevent knocking. The knock control apparatus determines whether knocking has occurred, and regulates operations of the internal combustion engine to prevent knocking.

The determination by the knock control apparatus depends on a signal output from a knock sensor. A typical knock sensor is a vibration pickup that is mounted onto the cylinder block. The knock sensor senses vibrations of the cylinder block in the frequency range specific to knocking and converts the vibrations into an electrical output signal. The knock control apparatus determines that knocking occurs when a knock intensity value LVPK, which is converted from the output signal of the knock sensor, is equal to or greater than a knock criterion level VKD. In contrast, the knock control apparatus determines that knocking does not occur when the knock intensity value LVPK is lower than the knock criterion level VKD. In accordance with the determination result, the knock control apparatus controls the internal combustion engine to prevent knocking, in other words, the knock control apparatus executes a knock prevention control. The knock prevention control is generally achieved by a responsive ignition timing control that results in more effective knock prevention. More specifically, the ignition timing is retarded when knocking is detected or advanced when knocking is not detected. This allows the knock control apparatus to control the internal combustion engine such that knocking is minimized within the allowable range or the engine conditions are maintained at the level immediately before knocking occurs.

The cylinder block vibrates not only due to knocking, but also due to driving the injectors, valves, and other components of the internal combustion engine. Thus, the output signals of the knock sensor include a true knock signal generated due to knocking as well as a false knock signal generated due to mechanical operations of the engine components. Therefore, if the false knock signal is improperly determined as the true knock signal, the ignition timing is unnecessarily retarded, which can lower the engine power output and the emission efficiency.

In view of this problem, the following knock control apparatuses for an internal combustion engine have been proposed. Japanese Patent Application Publication No. JP-A-Hei 6-101556 describes a knock control apparatus that calculates the angle of ignition timing retardation, performed under the retardation control, based on the output signal of the knock sensor, and determines whether the output signal of the knock sensor is a false knock signal based on the calculated retardation angle. To be more specific, the knock control apparatus presets a certain maximum threshold and minimum threshold. If the retardation angle falls within the range between the preset maximum threshold and the preset minimum threshold, the output signal is determined to be a false knock signal. In contrast, if the retardation angle falls out of the range, the output signal is determined to be a true knock signal.

Another knock control apparatus for an internal combustion engine is described in JP-A-2003-278592. The knock control apparatus described in JP-A-2003-278592 determines whether a signal, output from the knock sensor when knocking occurs is a true knock signal based on the knock intensity LVPK. The knock intensity LVPK is a value converted from the output signal of the knock sensor. More specifically, if the current knock intensity value LVPK is equal to or lower than its previous value, the output signal is determined to be a true knock signal. In contrast, if the current knock intensity value LVPK exceeds its previous value, the output signal is determined to be a false knock signal. In addition, if true knocking is detected, retarding the ignition timing prevents the knocking. This results in lower knock intensity LVPK. In contrast, if false knocking is detected mainly due to mechanical noise from the pistons and other components, retarding the ignition timing helps the false knocking grow louder. This results in higher knock intensity LVPK. Thus, the knock control apparatus determines if true or false knocking is detected based on the knock intensity LVPK, obtained under the ignition timing retardation control, or on the behavior of the output signal of the knock sensor.

However, a number of mechanical devices are mounted in the internal combustion engine so that mechanical noises also cause the cylinder block to vibrate. Vibrations of the cylinder block vary with the engine operating conditions. Due to this, the knock control apparatus, described in JP-A-Hei 6-101556, cannot avoid the problem of improper determination, such that the false knocking is improperly determined as true knocking, if the angle of ignition timing retardation, which is calculated based on the output signal of the knock sensor, falls out of the range between the preset maximum threshold and the preset minimum threshold. In turn, the knock control apparatus, described in JP-A-2003-278592, also has the similar problem, such that the output signal that indicates false knocking is improperly determined as true knocking, if the current knock intensity LVPK is equal to or lower than its previous value. As described above, any type of knock control apparatuses may not ensure sufficient accuracy of knock determination when the knock determination is based on the output signal of the knock sensor.

SUMMARY OF THE INVENTION

The present invention provides a knock control apparatus for an internal combustion engine, which achieves highly accurate knock determination relative to conventional knock control apparatuses that use an output signal of a knock sensor. The present invention also provides a knock control method for an internal combustion engine.

A first aspect of the invention is directed to a knock control apparatus for an internal combustion engine, the apparatus including: a first determination device that determines whether the internal combustion engine is knocking based on an output signal of a knocking detector provided in the internal combustion engine; a controller that retards an ignition timing of the internal combustion engine when the first determination device has determined that the internal combustion engine is knocking; and a second determination device that confirms whether the internal combustion engine is knocking based on the output torque of the internal combustion engine, which is obtained when the controller retards the ignition timing.

When an air-fuel mixture is burned in a combustion chamber of the internal combustion engine, spontaneous ignition or abnormal combustion may occur, which causes knocking. Retarding the ignition timing when knocking occurs in the internal combustion engine prevents spontaneous ignition or abnormal combustion in the combustion chamber. Nonetheless, this does not greatly lower combustion efficiency of the internal combustion engine. Thus, retarding the ignition timing when the internal combustion engine is knocking results in a small variation in output torque of the internal combustion engine. In contrast, retarding the ignition timing when false engine knocking occurs lowers the combustion efficiency of the internal combustion engine. Thus, retarding the ignition timing when false engine knocking occurs results in a large variation in output torque of the internal combustion engine. Therefore, whether the internal combustion engine is knocking is determined based on the output torque of the internal combustion engine that is obtained when the ignition timing is retarded.

The thus-configured knock control apparatus includes: the first determination device that determines whether the internal combustion engine is knocking based on the output signal of the knocking detector provided in the internal combustion engine; and the controller that retards the ignition timing of the internal combustion engine if the first determination device determines that the internal combustion engine is knocking. Thus, as in the case with the conventional apparatuses using a knock sensor, if it is determined that the internal combustion engine is knocking based on the output signal of the knock sensor, the engine ignition timing is retarded.

The knock control apparatus of the invention further includes the second determination device that confirms whether the internal combustion engine is knocking based on the output torque of the internal combustion engine obtained when the controller retards the ignition timing. Thus, when the output signal indicates false knocking, and the first determination device improperly determines the false knocking as true knocking, the second determination device confirms whether the internal combustion engine is knocking based on the output torque of the internal combustion engine. Therefore, even if various mechanical noises are produced depending on engine operating conditions, the use of the output torque of the internal combustion engine, which is independent of these mechanical noises, allows a proper determination whether the internal combustion engine is knocking. Consequently, the knock control apparatus of the invention achieves highly accurate knock determination relative to the conventional apparatuses using the output signal of the knock sensor.

More specifically, according to the first aspect of the invention, the second determination device may confirm that the internal combustion engine is not knocking, if a variation rate of the output torque of the engine, obtained when the controller retards the ignition timing, exceeds a variation rate in the output torque of the internal combustion engine that indicates true knocking. Also, according to the first aspect of the invention, the second determination device may confirm that the internal combustion engine is knocking, if the variation rate of the output torque of the internal combustion engine, obtained when the controller retards the ignition timing, falls within a range of variation rates in the output torque of the internal combustion engine that indicate true knocking.

Further, according to the first aspect of the invention, the variation rate of the output torque of the internal combustion engine may be a variation in output torque of the internal combustion engine per degree of retardation angle.

As described above, the variation rate of the output torque of the internal combustion engine is the variation in output torque of the internal combustion engine per degree of retardation angle. Therefore, although the retardation angle is variable with the output signal of the knock detector in a knock prevention control, a relationship between the retardation angle and the output torque is evaluated with respect to the same criterion for determining true or false knocking. This allows a more proper determination of whether the internal combustion engine is knocking.

According to the first aspect of the invention, if the second determination device confirms that the internal combustion engine is not knocking, the controller may reset the retarded ignition timing, which has been retarded when the first determination device has tentatively determined that the internal combustion engine is knocking, to an ignition timing before the retardation.

The controller thus-configured resets the retarded ignition timing to an ignition timing before the retardation, if the second determination device confirms that the internal combustion engine is not knocking. This prevents the ignition timing from being retarded when the first determination device improperly determines that the internal combustion engine is knocking. Accordingly, the output torque of the internal combustion engine is prevented from decreasing due to the retarded ignition timing.

According to the first aspect of the invention, if the second determination device confirms that the internal combustion engine is knocking, the controller may maintain the retarded ignition timing.

The controller thus-configured maintains the ignition timing, which has been retarded when the first determination device has determined that the internal combustion engine is knocking, if the second determination device confirms that the internal combustion engine is knocking. This allows the controller to maintain the retarded ignition timing because it has been accurately determined that the internal combustion engine is knocking by the first determination device and the second determination device.

A second aspect of the invention is directed to a method of controlling engine knock, the method including: determining whether the internal combustion engine is knocking based on an output signal of a knocking detector provided in the internal combustion engine; retarding an ignition timing of the internal combustion engine if it is determined that the internal combustion engine is knocking; and confirming whether the internal combustion engine is knocking based on an output torque of the internal combustion engine that is obtained when the ignition timing is retarded.

BRIEF DESCRIPTION OF THE DRAWINGS

The foregoing and further objects, features and advantages of the invention will become apparent from the following description of example embodiments with reference/to the accompanying drawings, wherein like numerals are used to represent like elements and wherein.

DETAILED DESCRIPTION OF THE PREFERRED EMBODIMENTS

Figure 1:
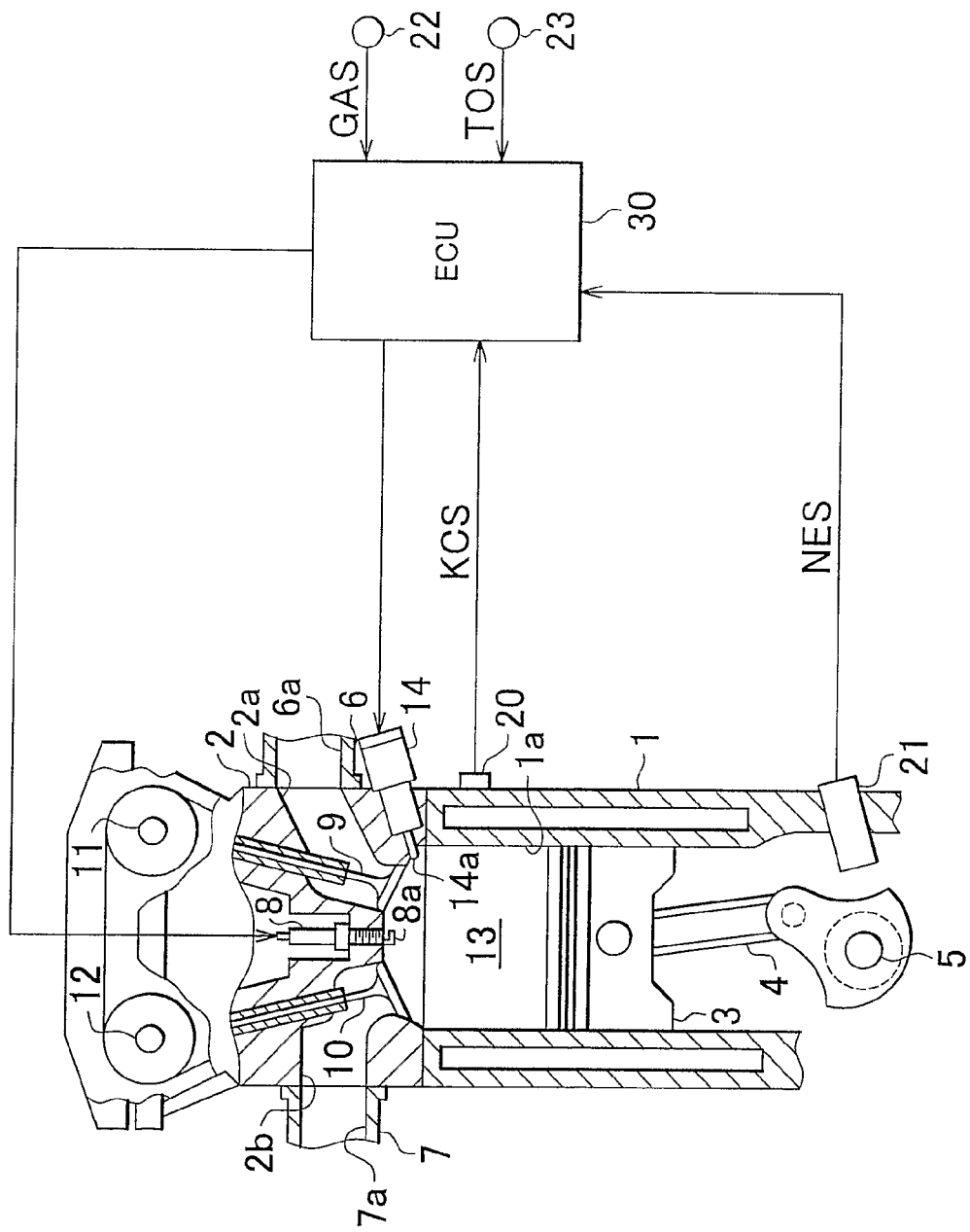
FIG. 1 is a schematic diagram of a knock control apparatus for an internal combustion engine according to one embodiment of the invention.

One embodiment of the invention, in which a knock control apparatus for an internal combustion engine is applied to a vehicle engine, will be described below with reference to FIGS. 1 to 3. As shown in FIG. 1, the engine includes: a cylinder block 1 with four cylinders 1a (only one of them is illustrated); and a cylinder head 2 disposed on the top of the cylinder block 1. A piston 3 is provided within each cylinder 1a for reciprocating motion. The piston 3 connects to a crankshaft 5 via a connection rod 4. The piston 3, the cylinder 1a, and the cylinder head 2 define a combustion chamber 13 corresponding to each cylinder.

The cylinder head 2 includes an intake port 2a and an exhaust port 2b, which are provided for each combustion chamber 13. The intake port 2a connects an intake branch passage 6a, formed in an intake manifold 6, to the combustion chamber 13. The intake port 2a and the intake branch passage 6a form a part of an intake passage. The exhaust port 2b connects an exhaust branch passage 7a, formed in an exhaust manifold 7, to the combustion chamber 13. The exhaust port 2b and the exhaust branch passage 7a form a part of an exhaust passage.

In the cylinder head 2, an intake valve 9 and an exhaust valve 10 are provided for opening and closing the intake port 2a and the exhaust port 2b, respectively. The intake valve 9 and the exhaust valve 10 are driven by an intake camshaft 11 and an exhaust camshaft 12, respectively. The intake camshaft 11 and the exhaust camshaft 12 operate in conjunction with rotations of the crankshaft 5.

In the cylinder head 2, an ignition plug 8 and a fuel injection valve 14 are also provided for each combustion chamber 13. A distal end of the ignition plug 8, that is an electrode 8a, is located at the center within the combustion chamber 13 between the opening of the intake port 2a and the opening of the exhaust port 2b. A distal end 14a of the fuel injection valve 14 is located within the combustion chamber 13 on the right of the opening of the intake port 2a in FIG. 1. The fuel injection valve 14 injects fuel from its hole, formed at the distal end 14a, directly into the combustion chamber 13.

The engine has several sensors for detecting respective engine operating conditions. For example, a knock sensor 20 is provided on the cylinder block 1. The knock sensor 20 is designed to output a knock signal KCS in response to the intensity of vibrations of the cylinder block 1. The knock sensor 20 may be considered as a knock detector in the knock control apparatus of the invention. Adjacent to the crankshaft 5, a rotational speed sensor 21 is provided for outputting the rotational speed signal NES in response to the rotational speed of the crankshaft 5 (engine speed). An air flow meter 22 is provided in the engine intake passage. The air flow meter 22 outputs an intake air volume signal GAS in response to the volume of intake air passing through the intake passage. A torque sensor 23 is connected to the crankshaft 5. The torque sensor 23 is designed to output a torque signal TOS in response to the torque transmitted to the crankshaft 5, that is, engine output torque.

The signals output from the respective sensors 20 to 23 are received by an engine electronic control unit 30 (hereinafter referred to as "ECU"). The ECU 30 includes a CPU, a memory, an input-output circuit, and a drive circuit. The ECU 30 reads and calculates parameters of the engine operating conditions based on the output signals. In addition, the ECU 30 regulates the operations of the ignition plug 8, the fuel injection valve 14, and other devices to control the combustion mode, ignition timing, fuel injection, and other various engine operating conditions.

The steps of the knock control process for the above-described engine will be described below with reference to FIGS. 2 and 3. A series of the steps shown in FIG. 2 are repeated by the ECU 30 at predetermined intervals.

Figure 2:
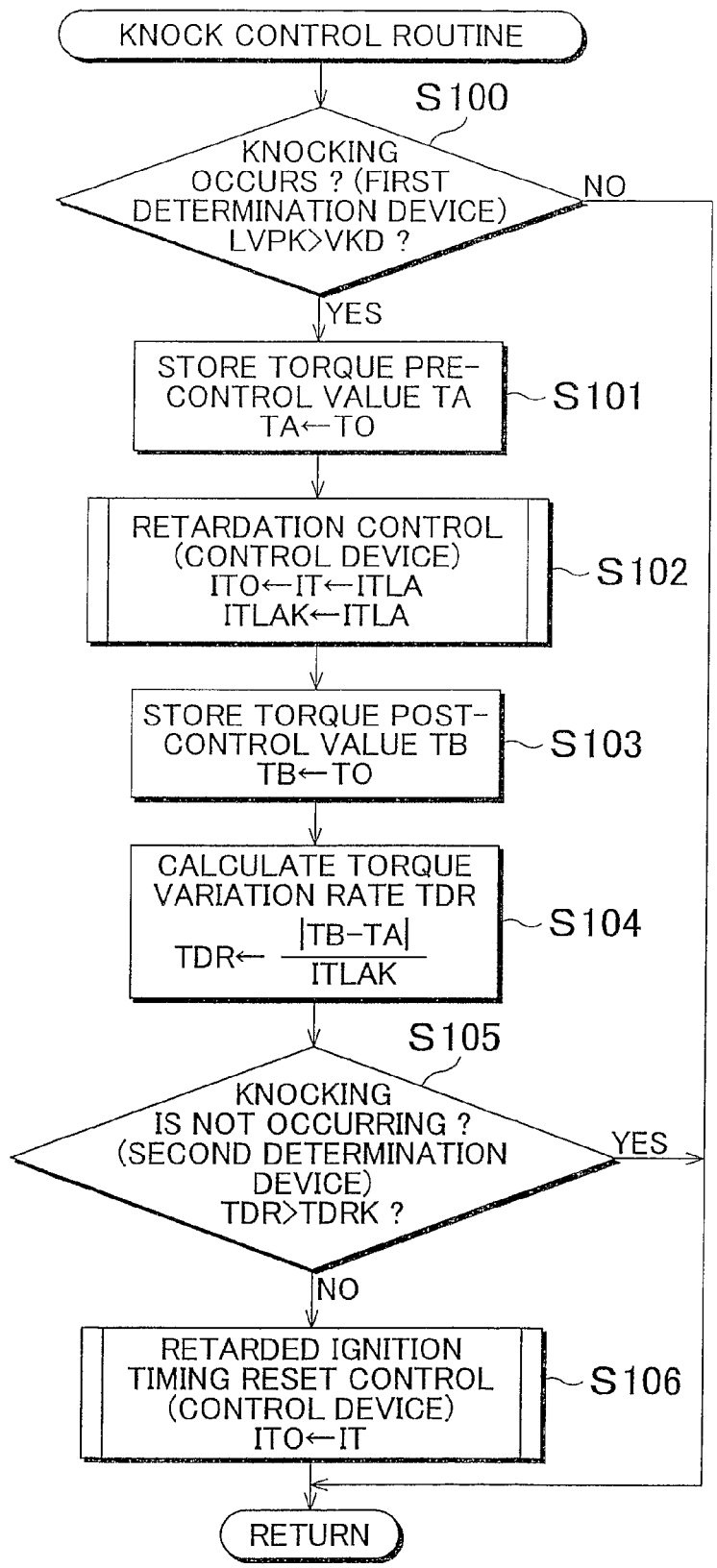
FIG. 2 is a flowchart showing the steps of a knock control process by the knock control apparatus of FIG. 1.

As shown in FIG. 2, it is first tentatively determined whether the knocking is occurring in the engine in step S100. To be more specific, a peak hold value of the knock signal KCS for a preset knock determination period is acquired for each cylinder. Also, a logarithmic transformation value of the peak hold value is calculated as knock intensity LVPK. The preset knock determination period includes the time at which knocking starts in the target cylinder. The knock intensity LVPK is compared to a preset knock criterion level VKD to determine the presence or absence of knock. In other words, if the knock intensity LVPK exceeds the knock criterion level VKD, the ECU 30 tentatively determines that knocking is occurring in the engine. If the knock intensity LVPK is equal to or lower than the knock criterion level VKD, the ECU 30 tentatively determines that knocking is not occurring in the engine. Step S100 may be considered as a step to be performed by a first determination device of the knock control apparatus of the invention. The knock criterion level VKD is empirically determined, and stored in the memory of the ECU 30.

If the ECU 30 tentatively determines that knocking is occurring in the engine (YES in step S100), an engine output torque TA (torque pre-control value), obtained prior to the ignition timing retardation control, is stored in the memory of the ECU 30 (step S101). The ignition timing retardation control will be discussed later. A torque transmitted to the crankshaft 5, that is, engine output torque TO, is calculated based on the torque signal TOS, and stored in the memory of the ECU 30 as the torque pre-control value TA.

After step S101, the ECU 30 executes the ignition timing retardation control for retarding the ignition timing of the ignition plug 8 (step S102). More specifically, the ECU 30 calculates the engine speed NE based on the rotational speed signal NES as well as the intake air volume GA based on the intake air volume signal GAS. The engine speed NE, the intake air volume GA, and the knock intensity LVPK are used to variably set a retardation angle ITLA with respect to a reference ignition timing IT of the ignition plug 8. The retardation angle ITLA is stored in the memory of the ECU 30 as retardation angle ITLAK. The reference ignition timing IT of the ignition plug 8 is preset under the ignition timing control performed by the ECU 30. The ignition timing control allows the reference ignition timing IT of the ignition plug 8 to be variably set depending on the engine speed NE, the intake air volume GA, and other parameters.

Under the ignition timing retardation control, the ignition timing ITO of the ignition plug 8 is determined in accordance with the following expression (1).

$$ITO = IT + ITLA \tag{1}$$

Step S102 may be considered as a step to be performed by a controller for retarding the engine ignition timing ITO in the knock control apparatus of the invention.

After step S102, an engine output torque TB (torque post-control value), obtained after the retardation control, is stored in the memory of the ECU 30 (step S103). More specifically, the engine output torque TO is calculated based on the torque signal TOS output from the torque sensor 23, and stored in the memory of the ECU 30 as the torque post-control value TB. For example, the torque post-control value TB is obtained at the point in time after each ignition timing ITO for all the cylinders has been subjected to the retardation control.

After step S103, the ECU 30 calculates an engine torque variation rate TDR (step S104). Specifically, the torque variation rate TDR is calculated in accordance with the following expression (2).

$$TDR=|TB-TA|/ITLAK \quad (2)$$

As shown by the expression (2), the torque variation rate TDR is the variation in engine output torque TO per unit retardation angle.

After step S104, the ECU 30 confirms whether the engine is not knocking (step S105). More specifically, if the torque variation rate TDR exceeds a specified torque variation rate TDRK, the ECU 30 confirms that the engine is not knocking. If the torque variation rate TDR is equal to or lower than the specified torque variation rate TDRK, the ECU 30 confirms that knocking is occurring in the engine. The specified torque variation rate TDRK is the maximum variation rate of the engine output torque TO that indicates true engine knocking. In other words, if the variation rate of the engine output torque, obtained when the ignition timing ITO is retarded, falls within the range of the variation rates that indicate true engine knocking, the ECU 30 confirms that knocking occurs in the engine. Step S105 may be considered as a step to be performed by a second determination device in the knock control apparatus of the invention.

Now, a method for calculating the specified torque variation rate TDRK will be described with reference to FIG. 3. In FIG. 3, the retardation angle is set to "0" when the engine ignition timing ITO is set at MBT (the ignition timing for optimum output and fuel consumption).

Figure 3:
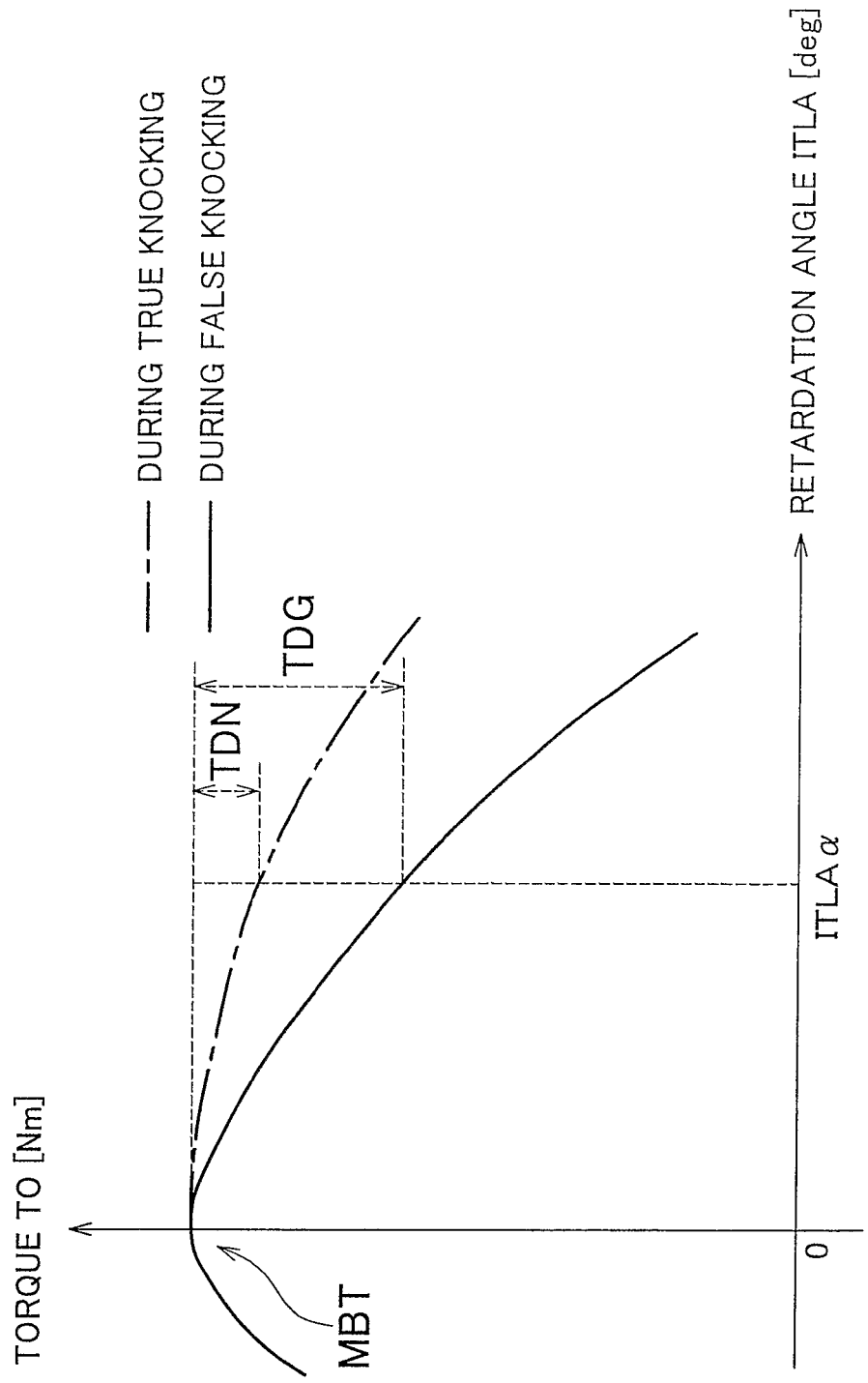
FIG. 3 is a graph showing a relationship between ignition timing retardation angle and engine output torque for the knock control apparatus of FIG. 1.

As shown in FIG. 3, in both the cases of true knocking (shown by the dot-and-dashed curve) and false knocking (shown by the solid curve), as the ignition timing ITO of the ignition plug 8 is retarded relative to the MBT, the engine output torque TO decreases. If the ignition timing is retarded by a given retardation angle ITLAα relative to the MBT, the torque decreases by an amount TDN during true knocking, while the torque decreases by an amount TDG during false knocking. A comparison between the amount TDN and the amount TDG establishes the relationship represented by the following expression (3).

$$TDN<TDG \quad (3)$$

More specifically, a comparison between the torque variation rate TDRN during true knocking and the torque variation rate TDRG during false knocking establishes the relationship represented by the following expression (4).

$$TDRN(=TDN/ITLA\alpha)<TDRG(=TDG/ITLA\alpha) \quad (4)$$

The torque variation rate TDRN that indicates true knocking may be considered as a variation rate in an output torque of the internal combustion engine during true engine knocking, according to the invention.

As the engine operation control parameters, such as engine speed NE and intake air volume GA, vary, the torque variation rate TDRN during true knocking and the torque variation rate TDRG during false knocking fluctuate. Therefore, in step S105, while satisfying the relationship shown by the following expression (5), the specified torque variation rate TDRK is set at the maximum variation rate of the engine output torque TO during true engine knocking.

$$TDRN<TDRK<TDRG \quad (5)$$

In the knocking confirmation process of the invention, the relationships between the specified torque variation rate TDRK and the respective engine operation control parameters are established empirically. Function data (function map) that defines these relationships is stored in the memory of the ECU 30. The ECU 30 calculates the engine operation control parameters based on the signals output from the respective sensors in the engine. Then, the ECU 30 calculates the specified torque variation rate TDRK with reference to the function map.

If it is confirmed that the engine is not knocking (NO in step S105), the ECU 30 executes the retardation control to reset the ignition timing ITO of the ignition plug 8 to the ignition timing before the retardation (step S106). To be more specific, the ignition timing ITO of the ignition plug 8 is reset in accordance with the following expression (6).

$$ITO=IT \quad (6)$$

After step S106, the series of steps end temporarily. In turn, the series of steps also end temporarily, if the ECU 30 tentatively determines that knocking is not occurring in the engine (NO in step S100), or if the ECU 30 confirms that knocking is occurring in the engine (YES in step S105).

In accordance with the knock determination process, if the ECU 30 tentatively determines in step S100 that knocking is occurring in the engine, and then confirms in step S105 that the engine is not knocking, the ECU 30 ultimately determines that the false engine knock has occurred. If the ECU 30 determines that the false engine knock has occurred, the retarded ignition timing ITO (IT+ITLA) is reset to the ignition timing before the retardation ITO (IT). In contrast, if the ECU 30 tentatively determines in step S100 that knocking is occurring in the engine, and then confirms in step S105 that knocking is occurring in the engine, the ECU 30 ultimately determines that the true engine knock has occurred. In such a case where the ECU 30 determines that the true engine knock has occurred, the retarded ignition timing ITO (IT+ITLA) is maintained.

According to the embodiment of the invention, the following functions and effects are achieved as has been discussed in detail. (1) When an air-fuel mixture is burned in the engine combustion chamber, spontaneous ignition or abnormal combustion may occur, which results in knocking. Retarding the ignition timing ITO when the engine is knocking prevents the spontaneous ignition or abnormal combustion in the combustion chamber. Nonetheless, this does not greatly lowers the engine combustion efficiency. Thus, retarding the ignition timing ITO when the engine is knocking results in a minimal decrease in engine output torque TO. In contrast, retarding the ignition timing ITO when the false engine knocking is occurring lowers the engine combustion efficiency. Thus, retarding the ignition timing ITO when the false engine knocking is occurring results in a high decrease in engine output torque TO. Therefore, whether knocking is occurring in the engine is determined based on the engine output torque TO obtained when the ignition timing ITO is retarded.

The knock control apparatus for an engine according to the embodiment of the invention is designed to execute the knock determination in step S100 and the retardation control. The knock determination is intended to tentatively determine if the engine is knocking based on the knocking signal KCS of the knock sensor 20 provided in the engine. The retardation control is intended to retard the engine ignition timing ITO, if the engine is tentatively determined to be knocking in step S100. Thus, when the engine is tentatively determined to be knocking, the engine ignition timing ITO is retarded, as in the case with the conventional apparatuses.

Further, the knock control apparatus of the invention is designed to perform the knock determination in step S105. The knock determination is intended to determine whether the engine is not knocking based on the engine output torque, which is obtained when the ignition timing ITO is retarded under the retardation control. Thus, if the output signal indicates false knocking, and the ECU 30 improperly determines the false knocking as true knocking in step S100, the ECU 30 re-determines in step S105 whether the engine is not knocking based on the engine output torque. Therefore, even if various mechanical noises are produced depending on the engine operating conditions, the use of the engine output torque TO, which is independent of these mechanical noises, allows the ECU 30 to properly determine whether knocking occurs in the engine. Consequently, the knock control apparatus of the invention achieves highly accurate knock determination relative to the conventional apparatuses using the knocking signal KCS of the knock sensor 20.

(2) The torque variation rate TDR of the engine output torque TO is the variation in engine output torque TO per unit retardation angle. Therefore, although the retardation angle ITLA varies with the knocking signal KCS of the knock sensor 20 in the retardation control, a relationship between the retardation angle ITLA and the output torque TO is evaluated with respect to the same criterion for determining true or false knocking. This enables the ECU 30 to more properly determine whether knocking is occurring in the engine.

(3) According to the embodiment of the invention, when the ECU 30 determines in step S105 that the engine is not knocking, the ignition timing ITO (IT+ITLA), which has been retarded as a result of the tentative determination in step S100 that the engine is knocking, is reset to the reference ignition timing IT before the retardation. This prevents the ignition timing from being retarded when the ECU 30 improperly determines in step S10 that the engine is knocking. Accordingly, a decrease in the engine output torque due to the retarded ignition timing ITO is avoided.

(4) According to the embodiment of the invention, when the ECU 30 determines in step S105 that knocking occurs in the engine, the ignition timing ITO (IT+ITLA) is maintained, which has been retarded as a result of the tentative determination in step S100 that the engine is knocking. This allows the ECU 30 to maintain the retarded ignition timing because it has been accurately determined that the engine is knocking through step S105 as well as step S100.

The embodiment may be modified as appropriate in the manner described below. The knock control apparatus for an internal combustion engine of the invention is applied in a four-cylinder engine in the aforementioned embodiment. However, the knock control apparatus may be applied to other types of engines with fewer than four cylinders or with five or more cylinders.

The engine torque variation rate TDR is calculated based on the expression (2) in the aforementioned embodiment. Alternatively, an engine torque reduction rate TDD may be calculated based on the following expression (7).

$$TDD=(TB-TA)/ITLAK \quad (7)$$

More specifically, because generally the retarded engine ignition timing ITO results in lower torque, the difference between the torque pre-control value TA and the torque post-control value TB may be used.

In the above embodiment, whether the occurrence of knocking in the engine is determined tentatively based on the signal output from the knock sensor 20 in response to the intensity of vibrations of the cylinder block 1. Alternatively, the tentative determination may be based on the pressure in the combustion chamber 13. Accordingly, the retardation angle ITLA may also be set based on the pressure in the combustion chamber 13 under the retardation control.

In the aforementioned embodiment, the retardation angle ITLA relative to the reference ignition timing IT of the ignition plug 8 may be variably set under the retardation control. Alternatively, the retardation angle ITLA may be set at a constant value. That is, a denominator in the expression (2) is the constant retardation angle ITLAK. Thus, the difference between the torque pre-control value TA and the torque post-control value TB may be solely used to obtain the torque variation rate TDR.

In the above-described embodiment, if the ECU 30 determines in step S105 that the engine is not knocking, the retardation control is executed to reset the ignition timing ITO of the ignition plug 8 to the ignition timing before the retardation. Alternatively, the ignition timing ITO may be reset to an intermediate timing between the ignition timing before the retardation and the retarded ignition timing.

In the above-described embodiment, if the ECU 30 determines in step S105 that knocking occurs in the engine, the retarded ignition timing ITO (IT+ITLA) is maintained. Alternatively, the ECU 30 may execute an additional retardation control to further retard the ignition timing ITO.

If the ECU 30 determines in step S105 that knocking is occurring in the engine, knocking may continue to occur in the engine even after the ignition timing ITO has been retarded under the retardation control in step S102. Thus, when the ECU 30 determines in step S105 that knocking is occurring in the engine, a second retardation control is executed to further retard the ignition timing ITO, in addition to the first retardation control in step S102. This more reliably prevents the engine from knocking. Furthermore, the retardation angle may vary depending on the torque variation rate TDR calculated in step S104 in the second retardation control.

The invention claimed is:

1. A knock control apparatus for an internal combustion engine, comprising:
    a first determination device that determines whether the internal combustion engine is knocking based on an output signal of a knock detector provided in the internal combustion engine;
    a controller that retards an ignition timing of the internal combustion engine if the first determination device determines that the internal combustion engine is knocking; and
    a second determination device that confirms whether the internal combustion engine is knocking based on an amount of change in an output torque of the internal combustion engine obtained when the controller retards the ignition timing.

2. The knock control apparatus according to claim 1, wherein the second determination device confirms that the internal combustion engine is not knocking when a variation rate of the output torque of the internal combustion engine, obtained when the controller retards the ignition timing, exceeds a variation rate in the output torque of the internal combustion engine that indicates true knocking.

3. The knock control apparatus according to claim 1, wherein the second determination device confirms that the internal combustion engine is knocking when the variation rate of the output torque of the internal combustion engine, obtained when the controller retards the ignition timing, falls within a range of variation rates in the output torque of the internal combustion engine that indicates true knocking.

4. The knock control apparatus according to claim 3, wherein the variation rate of the output torque of the internal combustion engine is a variation in output torque of the internal combustion engine per degree of retardation angle.

5. The knock control apparatus according to claim 1, wherein if the second determination device confirms that the internal combustion engine is not knocking, the controller resets the ignition timing, which has been retarded when the first determination device has determined that the internal combustion engine is knocking, to an ignition timing before the retardation.

6. The knock control apparatus according to claim 1, wherein if the second determination device confirms that engine knock is not occurring, the controller resets the ignition timing, which has been retarded when the first determination device has determined that the internal combustion engine is knocking, to an intermediate timing between an ignition timing before the retardation and the retarded ignition timing.

7. The knock control apparatus according to claim 1, wherein if the second determination device confirms that engine knock is occurring, the controller maintains the ignition timing, which has been retarded when the first determination device has determined that the internal combustion engine is knocking.

8. The knock control apparatus according to claim 1, wherein if the second determination device confirms that engine knock is occurring, the controller further retards the ignition timing, which has been retarded when the first determination device has determined that the internal combustion engine is knocking.

9. The knock control apparatus according to claim 2, wherein the variation rate of the output torque of the internal combustion engine is a variation in output torque of the internal combustion engine per degree of retardation angle.

10. A knock control method for an internal combustion engine, comprising:
    determining whether the internal combustion engine is knocking based on an output signal of a knocking detector provided in the internal combustion engine;
    retarding an ignition timing of the internal combustion engine if it is determined that the internal combustion engine is knocking; and
    confirming whether the internal combustion engine is knocking based on an amount of change in an output torque of the internal combustion engine that is obtained when the ignition timing is retarded.

11. The knock control method according to claim 10, wherein if a variation rate of the output torque of the internal combustion engine, obtained when the ignition timing is retarded, exceeds a variation rate in the output torque of the internal combustion engine that indicates true knocking, it is confirmed that the internal combustion engine is not knocking.

12. The knock control method according to claim 10, wherein if the variation rate of the output torque of the internal combustion engine, obtained when the ignition timing is retarded, falls within a range of variation rates in the output torque of the internal combustion engine that indicate true knocking, it is confirmed that the internal combustion engine is knocking.

13. The knock control method according to claim 12, wherein the variation rate of the output torque of the internal combustion engine is a variation in output torque of the internal combustion engine per degree of retardation angle.

14. The knock control method according to claim 10, wherein if it is confirmed that the internal combustion engine is not knocking, the retarded ignition timing is reset to an ignition timing before the retardation.

15. The knock control method according to claim 10, wherein if it is confirmed that the internal combustion engine is not knocking the retarded ignition timing is reset to an intermediate timing between an ignition timing before the retardation and the retarded ignition timing.

16. The knock control method according to claim 10, wherein if it is confirmed that the internal combustion engine is knocking the retarded ignition timing is maintained.

17. The knock control method according to claim 10, wherein if it is confirmed the internal combustion engine is knocking the retarded ignition timing is further retarded.

18. The knock control method according to claim 11, wherein the variation rate of the output torque of the internal combustion engine is a variation in output torque of the internal combustion engine per degree of retardation angle.

* * * * *